(No Model.)
P. T. DENIO.
SLED BRAKE.
No. 481,480. Patented Aug. 23, 1892.
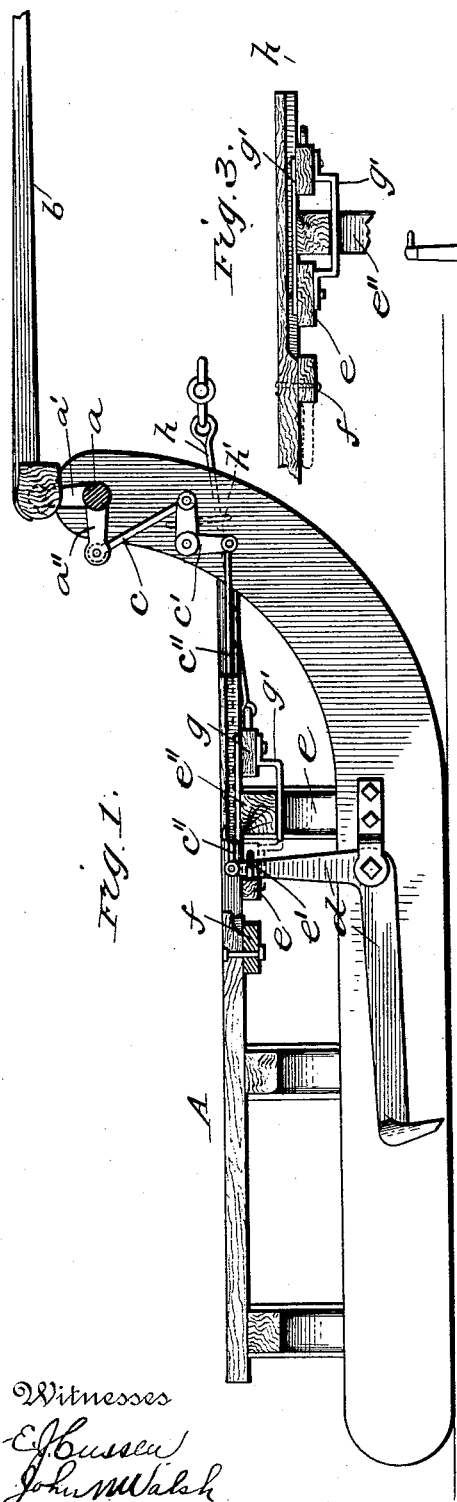
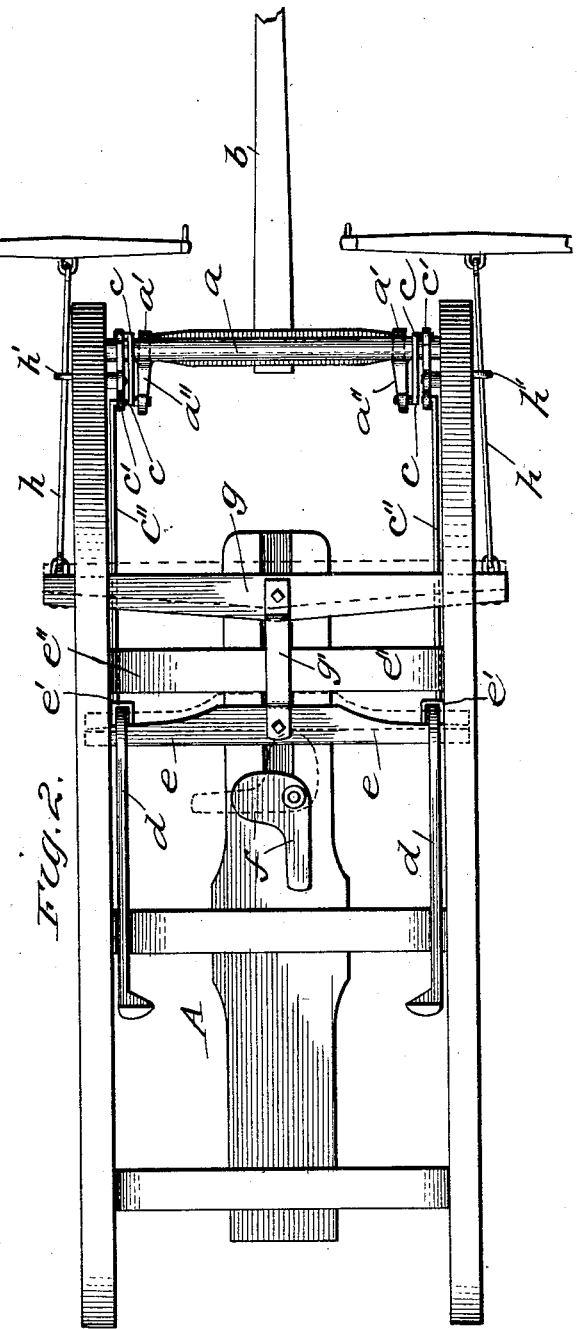
Witnesses
E. J. Hussey
John M. Walsh
Inventor
Preston T. Denio
By his Attorneys
Alexander T. Davis

UNITED STATES PATENT OFFICE.

PRESTON T. DENIO, OF HYDE PARK, VERMONT.

SLED-BRAKE.

SPECIFICATION forming part of Letters Patent No. 481,480, dated August 23, 1892.

Application filed April 4, 1892. Serial No. 427,701. (No model.)

*To all whom it may concern:*

Be it known that I, PRESTON T. DENIO, a citizen of the United States, residing at Hyde Park, Vermont, have invented certain new and useful Improvements in Sled-Brakes, of which the following is a specification, reference being had therein to the accompanying drawings, in which—

Figure 1 represents a vertical longitudinal sectional view of my improved sled; Fig. 2, a bottom plan thereof, and Fig. 3 a detail sectional view hereinafter described.

This invention has relation particularly to that class of sleds wherein the noses or upturned forward ends of the runners extend a considerable distance above the platform, and the object I have in view is to provide such sleds with improved and simple devices for automatically applying the brakes in descending grades, thereby enabling the teams to handle heavy loads with greater ease, as more fully hereinafter set forth.

In the drawings, A designates the sled, which is substantially of the usual construction, having the forward ends of its runners extended up above the platform, as shown. Connecting the forward upper ends of the runners and having its ends journaled therein is a transverse rock-shaft $a$, provided with a pair of short upwardly-extending arms $a'$ and a pair of similar rearwardly-extending arms $a''$, one arm of each pair being located at or near each end of the shaft. Pivoted between the ends of the upwardly-extending arm is a cross-bar rigidly secured to the rear end of a pole or tongue $b$, and depending from each of the arms $a''$ is a pivotal rod $c$, the lower end of which pivotally connects to the forward ends of bell-crank levers $c'$, pivoted on the adjacent runners. Pivotally connected to each of the lower ends of the angle-levers is a rod $c''$, which extends rearwardly and pivotally connects with the upper ends of the vertical arms of the respective brake-dogs $d$, these dogs being pivotally attached to the adjacent runners and having the rear ends of their horizontal arms bent downwardly. The rods $c''$ are below the platform-surface, so as to be out of the way. The upper ends of the vertical arms of the brake-dogs are connected, so as to move in unison, by a transverse bar $e$, which extends across the sled close under the platform and close to the front cross-bar $e''$ of the sled and is connected to the brake-dog arms by staples or eyebolts $e'$. Pivoted on the under side of the platform in the rear of the bar $e$ is a cam-lever $f$, which serves to press said bar $e$ forward against the stationary cross-bar $e''$ and lock it against movement, thereby throwing out of use the entire brake mechanism. The doubletree or whiffletree $g$ is pivoted below the platform between the forward ends of metallic straps $g'$, connected to the center of the bar $e$, these straps being longitudinally movable with the whiffletree and bar and embracing between them the stationary cross-bar $e''$ of the sled-frame. These straps, by embracing the bar $e''$—that is, passing above and below the same—serve to assist in guiding and supporting the whiffletree and connecting-bar $e$. The ends of the whiffletree project slightly beyond the sides of the runners and have pivotally connected to said extended ends draft-rods $h$, which extend forward on the outside of the runners and carry singletrees on their forward ends, the draft-rods being supported and limited in their play by loops $h'$, secured on the runners.

The operation of the brake mechanism is obvious. In descending grades the team pushes back on the pole, whereupon the rock-shaft will rock rearwardly, and, through the medium of the rods and angle-levers, force the brake-dogs into engagement with the ground, thus effectually checking the descent of the sled. In ascending grades or in traveling upon level ground the draft through the singletrees and whiffletree serves to keep the brake-dogs out of engagement with the ground, as is evident.

It will be observed that the draft of the sled is upon the singletrees, the pole being employed simply to control or guide the sled and apply the brakes.

The devices are simple in construction and effective in operation, and they are also very durable and strong.

Having thus fully described my invention, what I claim, and desire to secure by Letters Patent, is—

1. The combination of a sled, a rock-shaft pivoted between the upwardly-turned ends of its runners and provided with vertically and rearwardly extending arms, a pole pivoted between the vertical arms, depending rods pivoted to the rearwardly-extending arms, angle-levers pivoted on the sled-runners, rearwardly-extending rods connected to these angle-levers, and brake-dogs pivoted on the runners and having their upper arms pivotally connected to the rearwardly-extending rods, substantially as described.

2. The combination of a sled, a rock-shaft pivoted between the forward ends of the runners and provided with two sets of arms, one set projecting upwardly and the other rearwardly, a pole pivoted between the upwardly-projecting arms, brake-dogs pivoted on the sled-runners, rods and levers pivotally connecting the upper ends of the brake-dogs to the rearwardly-extending arms on the rock-shaft, a bar connecting the upper ends of the brake-dogs, a whiffletree pivotally connected about midway its ends to said bar, draft-rods connected to the whiffletree and extended forward beyond the runners, and singletrees on these draft-rods, substantially as described.

3. The combination of a sled, a pair of brake-dogs pivoted on the runners and having their upper ends connected by a movable cross-bar, means for operating these brake-dogs from the draft-pole, and a pivoted cam on the platform adapted to press the cross-bar forward and hold the brake-dogs out of engagement with the ground, substantially as described.

In testimony whereof I affix my signature in presence of two witnesses.

PRESTON T. DENIO.

Witnesses:
HENRY M. NOYES,
C. A. DENIO.